US011308375B2

United States Patent
de Beus (10) Patent No.: US 11,308,375 B2
(45) Date of Patent: Apr. 19, 2022

(54) SYSTEM AND METHOD FOR DETECTING COLOR CONVERSION PROBLEMS IN A PRINTED IMAGE

(71) Applicant: KYOCERA Document Solutions, Inc., Osaka (JP)

(72) Inventor: Eric de Beus, Redondo Beach, CA (US)

(73) Assignee: KYOCERA Document Solutions, Inc., Osaka (JP)

(*) Notice: Subject to any disclaimer, the term of this patent is extended or adjusted under 35 U.S.C. 154(b) by 72 days.

(21) Appl. No.: 17/005,080

(22) Filed: Aug. 27, 2020

(65) Prior Publication Data

US 2022/0067465 A1    Mar. 3, 2022

(51) Int. Cl.
| | | |
|---|---|---|
| G06K 15/00 | (2006.01) | |
| G06T 7/90 | (2017.01) | |
| G06K 15/02 | (2006.01) | |
| G06T 7/00 | (2017.01) | |
| G06K 15/12 | (2006.01) | |

(52) U.S. Cl.
CPC ......... *G06K 15/408* (2013.01); *G06K 15/027* (2013.01); *G06K 15/129* (2013.01); *G06K 15/1822* (2013.01); *G06K 15/1878* (2013.01); *G06T 7/0004* (2013.01); *G06T 7/90* (2017.01); *G06T 2207/10024* (2013.01); *G06T 2207/30144* (2013.01)

(58) Field of Classification Search
CPC .. G06K 15/408; G06K 15/027; G06K 15/129; G06K 15/1822; G06K 15/1878; G06T 7/90; G06T 7/0004; G06T 2207/10024; G06T 2207/30144
See application file for complete search history.

(56) References Cited

U.S. PATENT DOCUMENTS

| | | |
|---|---|---|
| 7,064,862 B2 | 6/2006 | Takashimizu |
| 9,232,113 B2 | 1/2016 | Miyanaga |
| 9,742,929 B2 | 8/2017 | Zakharov |
| 9,792,514 B2* | 10/2017 | Ukishima ............... B41J 2/2146 |
| 10,462,309 B2* | 10/2019 | Zakharov ........... H04N 1/00015 |
| 2013/0039574 A1 | 2/2013 | McKay et al. |

* cited by examiner

*Primary Examiner* — Quang N Vo
(74) *Attorney, Agent, or Firm* — Rowan TELS LLC (57) ABSTRACT

A method and system for detecting color conversion problems in a printed image, wherein a region of interest comprising pixels is identified on print job image. A pixel color value for at least one color plane is received for each pixel in each region of interest, as well as pixel color values adjacent to each region of interest. An average pixel color value is calculated for the pixels immediately surrounding each single pixel. This average pixel color value is compared to the pixel color value for the single pixel. A number of instances where the pixel color value and the average pixel color value exceeds a first threshold value is calculated. If the number of instances is less than a second threshold value, a new image is processed. If the number of instances is more than the second threshold value, the print job is flagged for review.

20 Claims, 9 Drawing Sheets

SYSTEM AND METHOD FOR DETECTING COLOR CONVERSION PROBLEMS IN A PRINTED IMAGE

BACKGROUND

Production printing necessitates exact color matching, which involves combining color profile data from the documents to be printed with color profile data from the printer (characterizing the printer's engine, inks, and papers), and creating multidimensional color lookup tables for color conversion of images, such as color conversion tables.

An image forming apparatus such as a Multi-Functional Peripheral (MFP), is able to print a text document, an image, or a document containing both text and images. A color value in a red, green, blue (RGB) color space may be used for general print data of an image forming apparatus. In contrast to this, the color value in a cyan, magenta, yellow, black or key plate (CMYK) color space is often used in outputting to recording sheets in the image forming apparatus. In view of this, the image forming apparatus performs a color conversion from the color value in the RGB color space into the color value in the CMYK color space for image formation.

Simple conversion equations exist for the color conversion from the RGB color space into the CMYK color space, such as:

$$C=(1-R-K)/(1-K)$$

$$M=(1-G-K)/(1-K)$$

$$Y=(1-B-K)/(1-K)$$

$$K=\min(1-R,1-G,1-B)$$

However, performing the color conversion accurately using the above-described equations is difficult for the model dependent CMYK color space. In view of this, a color conversion table is used. "Color conversion table" refers to a lookup table used for the color conversion from the red, green, blue, (RGB) color space often used in assigning colors to text and image pixels for display on a computer screen, into the cyan, magenta, yellow, black or key plate (CMYK) color space used by a printing device to apply varying amounts of ink in those colors to a printed page.

In a color conversion table, when RGB each have 8 bits, holding an assignment of an output value of CMYK or a device independent color space (e.g., a CIE XYZ color space, a CIE LAB/CIE LCh color space, or a similar color space) causes too much data volume with respect to input values of about 1,678 million colors, which are 256 tones to the third power for each color. In view of this, it is a practice by some users that the color conversion table, where the data volume is reduced by thinning the colors instead of using all colors in the RGB color space, is created and is stored in the image forming apparatus.

In the color conversion table where the data volume is reduced, the assignment from the color value in the RGB color space into the color value in the CMYK color space may be set for each grid point, which divides the RGB color space at a predetermined interval. For the color value other than the position of the grid point, the color value in the CMYK color space is calculated by an interpolation operation. In the interpolation operation, a method such as a linear interpolation or an interpolation by an approximation formula is used. For example, an image processing apparatus may preliminarily register high-order bits as grid point information and low-order bits as information on determining an interpolation proportion and perform an N-point interpolation using information described above.

There are various ways for color data and color lookup tables to become corrupted, either in memory or on disk, and there is usually no way to detect this until printed images are verified visually. This may result in lost time and resources in the form of paper and ink used to create a printed product that may not be usable. There is, therefore, a need for a solution that analyzes data pertaining to images to be printed after color conversion but before printing, in order to determine if a color conversion table has been corrupted.

BRIEF SUMMARY

This disclosure relates to a method for detecting color conversion problems in a printed image. This method comprises initiating a smoothness determination. First, a region of interest is identified on an image for a print job. The region of interest comprises pixels. A pixel color value for at least one color plane is received for each pixel in each region of interest, as well as pixel color values for pixels adjacent to each region of interest. An average pixel color value is then calculated for a group of neighboring pixels immediately surrounding each single pixel in each region of interest. Next, the calculated average pixel color value for the group of neighboring pixels is compared to the pixel color value for the corresponding single pixel. A number of instances where the pixel color value of the single pixel differs from the average pixel color value of the group of neighboring pixels by more than a first threshold value is calculated. If the number of instances is less than a second threshold value, a new image may be obtained for processing. If the number of instances is more than the second threshold value, the print job may be flagged for review.

This disclosure further relates to a system that detects color conversion problems in a printed image. The system comprises a printing device, a print server, a processor, and a memory. The memory stores instructions that, when executed by the processor, configure the system to initiate a smoothness determination as disclosed herein.

Finally, this disclosure relates to a non-transitory computer-readable storage medium that includes instructions for detecting color conversion problems in a printed image. These instructions, when executed by a computer, cause the computer to initiate a smoothness determination as disclosed herein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The solutions disclosed herein act to sample a few regions of an image and check them for smoothness by comparing each pixel to its nearest neighbors. "Smoothness" for the purposes of this disclosure refers to a similarity of value for one or more pixel color value parameters across a set of pixels. Color images have a high degree of smoothness, that is, the color values do not change radically between one pixel and its neighbors over most of the image. Since color conversion problems will normally affect every area of an image, it is not necessary to check most of the image area. If the smoothness of the samples is outside of the expected parameters, the print job can be held, or flagged as possibly having color conversion problems.

An additional check can be made of the relevant color tables, which will normally be monotonic, either as a whole or in parts. This means that, as values progress across a table, the difference between the values for subsequent entries will remain similar; values will increase across the table or decrease across the table at a predictable rate. Typically, color conversion tables list values in increasing order. If a table is examined and a value for one entry is less than the preceding entry, the color table may be determined to lack monotonicity.

If the images lack smoothness and the color tables lack monotonicity, the print job should be flagged as possibly having color conversion problems.

One of skill in the art will realize that the methods and systems in this disclosure describe a technological improvement over the current technology, thereby allowing the system to operate more efficiently. Because the color conversion tables are checked before printing an image, an additional step of reprinting an image again, due to smoothness errors, may be saved. Additionally, because a group of neighboring pixels immediately surrounding each single pixel in the region of interest is sampled, the entire image may not necessarily need to be evaluated, thereby saving memory and computing resources. Further, a division of the image into a plurality of bands of pixels, and selecting pixels within the bands, may also add efficiency by reducing the need for memory and computing resources due to fewer data points needing to be stored and processed.

Figure 1A:
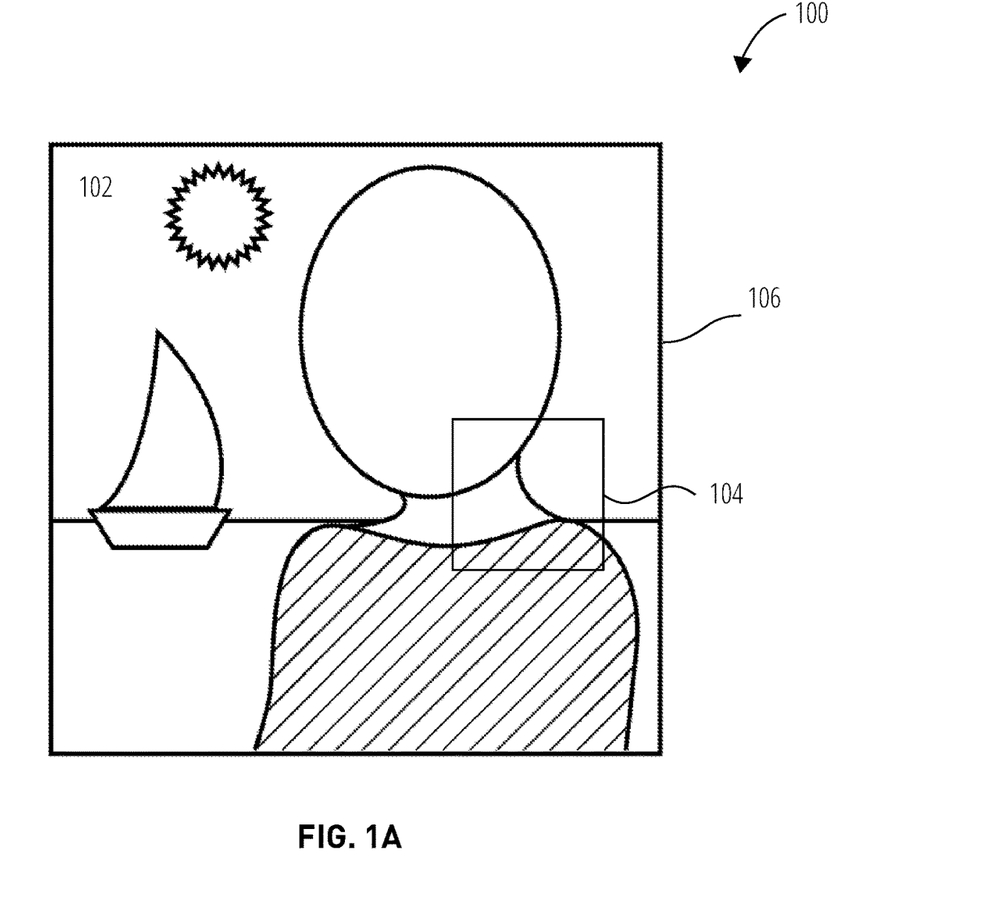
FIG. 1A illustrates a region of interest 100 in accordance with one embodiment.

FIG. 1A illustrates a region of interest 100 in accordance with one embodiment. "Region of interest" for the purposes of this disclosure refers to a set of pixels to be analyzed using the disclosed method to detect color conversion problems.

An image 102 is indicated comprising a graphical representation of foreground objects such as a person and background objects, such as a boat and water scene. A portion of the image 104 is also indicated, comprising a smaller set of the pixels that make up the full image 102, such as a group including a portion of the person and the water in the background.

In cases where an image 102 is relatively small relative to the amount of memory needed to process it, the whole image 102 can be evaluated as a in implementing the disclosed solution.

Figure 1B:
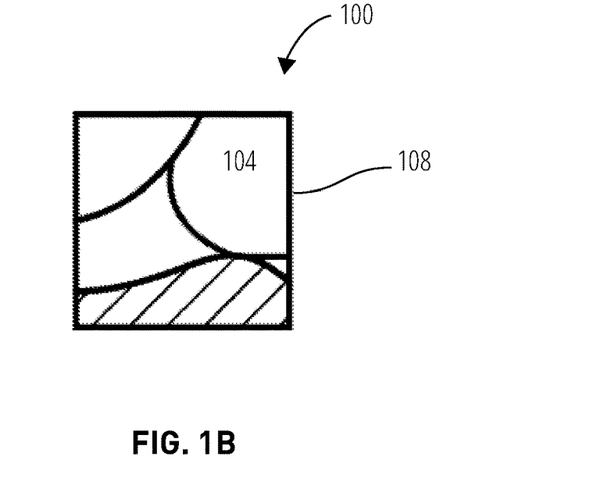
FIG. 1B illustrates a region of interest 100 in accordance with one embodiment.

FIG. 1B illustrates a region of interest 100 in accordance with one embodiment. For larger images, the region of interest 108 evaluated may be limited to portion of the image 104, shown with respect to the full image in FIG. 1A. Each pixel within the region of interest selected, whether region of interest 106 or region of interest 108, may be evaluated for smoothness in comparison with its neighbors as described in further detail with respect to FIG. 2.

Figure 2:
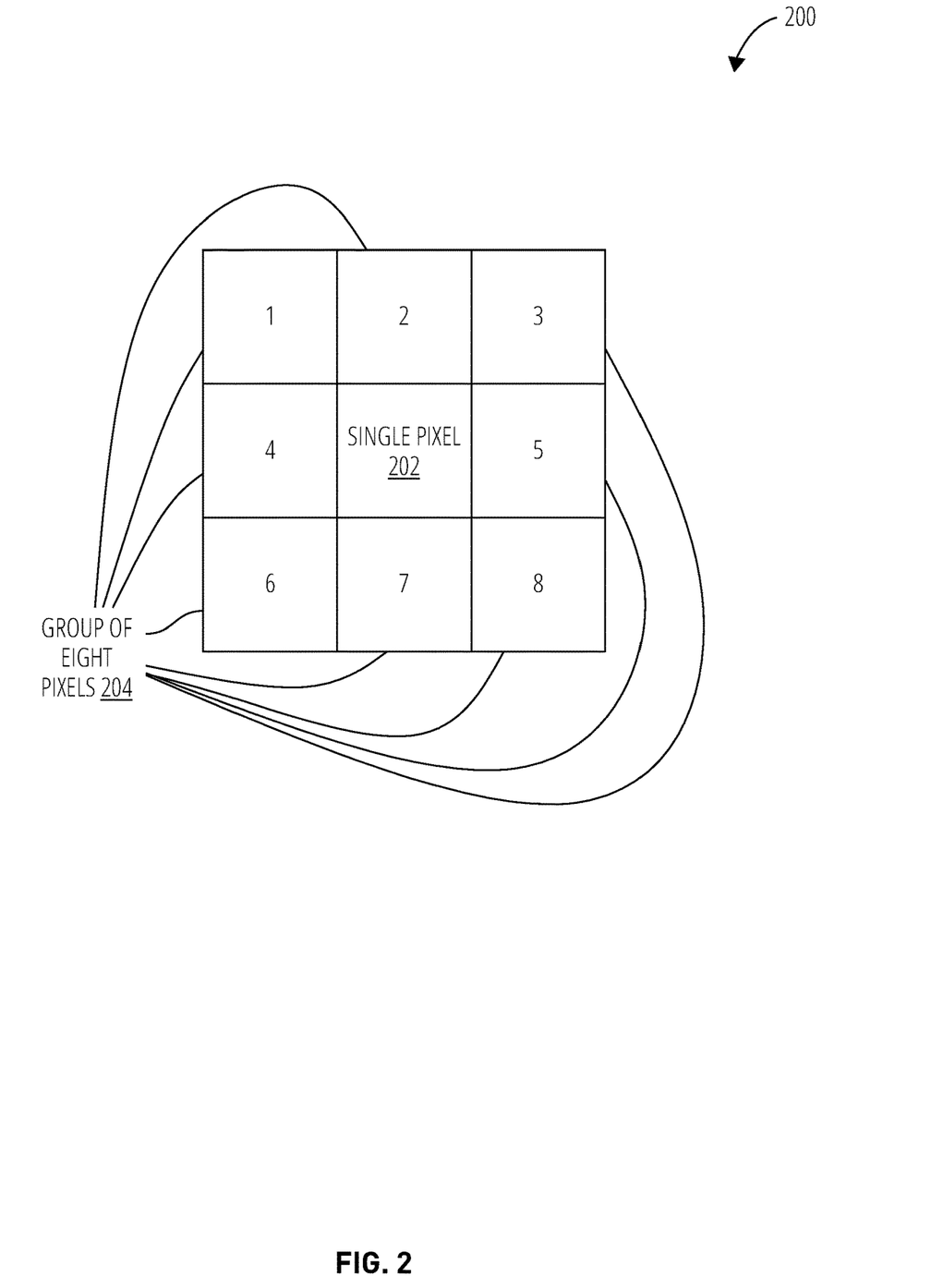
FIG. 2 illustrates a single pixel and group of neighboring pixels 200 in accordance with one embodiment.

FIG. 2 illustrates a single pixel and group of neighboring pixels 200 in accordance with one embodiment. A single pixel 202 is shown, surrounded by the group of eight pixels 204 that comprise its group of neighboring pixels.

"Group of neighboring pixels" refers to the pixels immediately surrounding a single pixel being evaluated for smoothness. For pixels arranged in a square grid, the single pixel under consideration would be surrounded by a group of eight pixels, four that contact the four sides of the square pixel and four that contact each of the four corners of the pixel.

"Pixel color value" refers to a numerical weight assigned to a pixel for a particular color plane. The pixel color values for all of the available color planes (e.g., red, green, and blue for screen display) combine to indicate a hue the pixel is intended to be displayed with. For an RGB screen display, these pixel color values may indicate the intensity or brightness a small light source providing light of the indicated color will be lit at a pixel location. The combined light from a red, green, and blue light source in close proximity gives the pixel the appearance of the desired hue. For a CMYK printing task, the pixel color values may indicate an amount of ink of the corresponding color plane to be deposited at a point location on a page to give the appearance of the desired hue.

"Color plane" refers to one of the color options in the CMYK color space, i.e., one of the cyan, magenta, yellow, or black or key plate options, or to one of the color options in the RGB color space, i.e., one of the red, green, or blue channel options.

The smoothness estimate disclosed herein may be performed by first capturing a region of interest from an image, using random locations for regions of interest that are portions of a larger image, as described with respect to FIG. 1A and FIG. 1B. Each region of interest may then be processed by finding the eight nearest neighbors of each single pixel 202, i.e., the group of eight pixels 204, computing the average pixel color value for the group of eight pixels 204 using the pixel color values for one color plane, comparing that average to the pixel color value for single pixel, and counting the number of instances where the pixel color value differs by more than a first threshold value from the average value of its neighbors. This evaluation is repeated for every single pixel 202 in the region of interest. If the total number of instances is found to exceed a second threshold value, the image may be regarded as lacking smoothness.

As an example, a 4,096-pixel region of interest may be evaluated for smoothness. Pixels with pixel color values within a first threshold value of 10% of the average pixel color value for their group of neighboring pixels may be considered adequately smooth. A region of interest determined to have a number of instances that is less than a second threshold value of 10% may indicate that the image is fine and the image color conversion table has not suffered a corruption. For the illustrated single pixel 202 and the group of eight pixels 204 around it, the following pixel color values may be obtained for a single color plane.

TABLE 1

| Pixel color values for one color plane | |
|---|---|
| Pixel 1 | 5.5 |
| Pixel 2 | 4.8 |
| Pixel 3 | 4.7 |
| Pixel 4 | 5.4 |
| Pixel 5 | 5.7 |
| Pixel 6 | 5.3 |
| Pixel 7 | 5.1 |
| Pixel 8 | 5.0 |
| Pixel color value for single pixel 202 | 5.2 |
| Average pixel color value for group of eight pixels 204 | 5.1875 |

For this example, the single pixel 202 and group of eight pixels 204 have a less than 10% difference between the pixel color value for single pixel and average pixel color value. For a first threshold value of 10%, this single pixel 202 is adequately smooth, and does not result in an increase in the number of instances. If the single pixel 202 had a pixel color value of around 5.7, the difference between this value and the average would exceed 10%, and the number of instances would increase by one. For the region of interest containing 4,096 pixels, and a second threshold value of 10%, if 41 or more number of instances are detected, the image may be determined as lacking smoothness, indicating a potential problem with the color conversion table used. Alternately, detecting 40 or fewer number of instances may indicate that the image is adequately smooth.

It will be obvious to anyone skilled in the art that parameters such as the number, size, and position of the sampled regions may be adjusted, as may the second threshold value for the number of pixels deviating from their neighbors indicating image smoothness and the first threshold value for the extent of deviation that is considered countable.

Figure 3A:
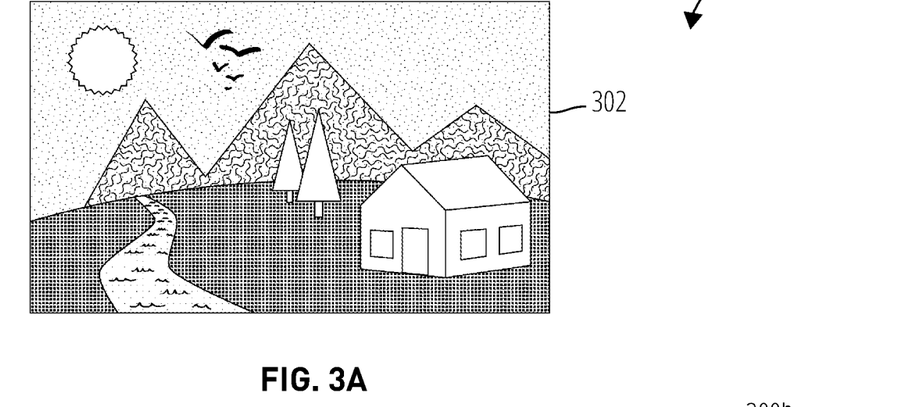
FIG. 3A illustrates a large image to be processed in bands of pixels 300a in accordance with one embodiment.

FIG. 3A illustrates a large image to be processed in bands of pixels 300a in accordance with one embodiment. A large image 302 is indicated, which may take up too much room in memory for the printing device to process the entire image for printing at a time. In such a case, the printing device may process the large image 302 into a large image divided into bands of pixels 300b, as shown in FIG. 3B.

Figure 3B:
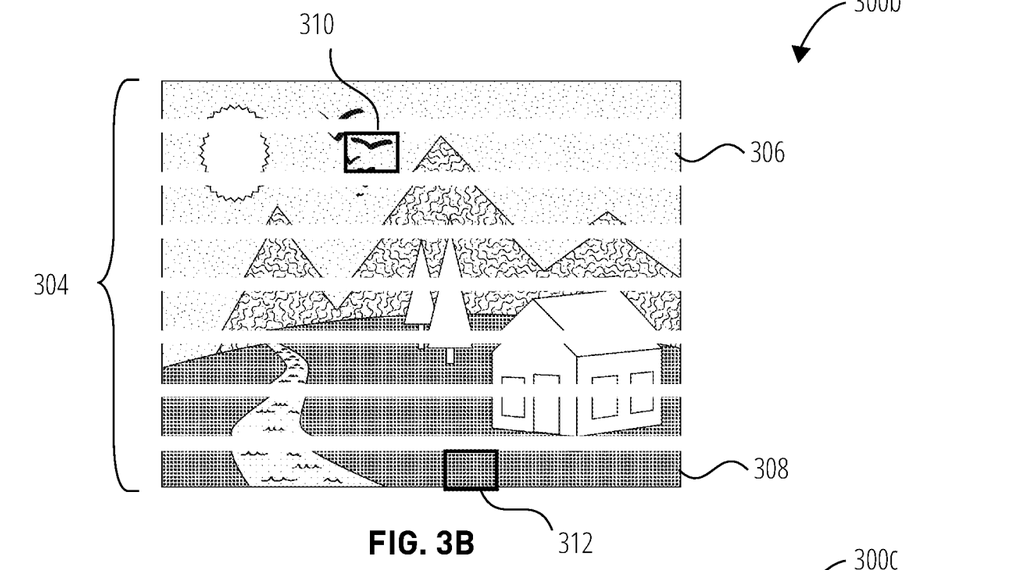
FIG. 3B illustrates a large image divided into bands of pixels 300b in accordance with one embodiment.

FIG. 3B illustrates a large image divided into bands of pixels 300b in accordance with one embodiment. In cases where the large image 302 is processed into a large image divided into bands of pixels 300b, the large image 302 may be split up into bands of pixels 304 as shown.

A first band of pixels 306 and in some embodiments a second band of pixels 308 may be selected randomly from the bands of pixels 304. A first region of interest 310 may be selected from the first band of pixels 306. A second region of interest 312 may be randomly selected from the second band of pixels 308.

Figure 3C:
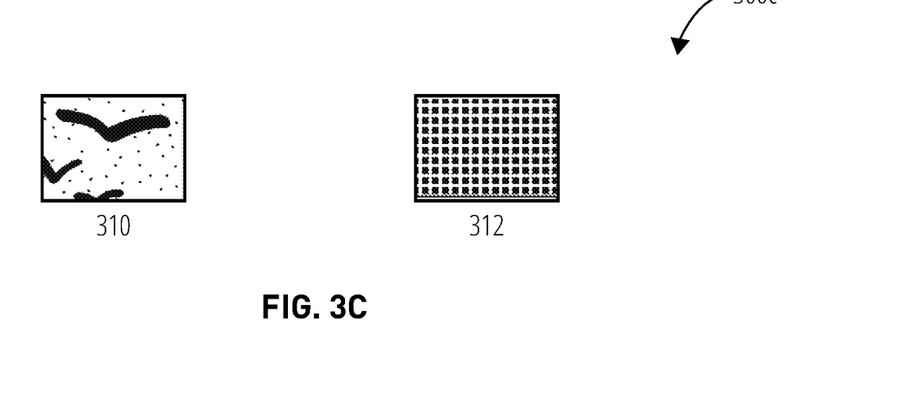
FIG. 3C illustrates regions of interest 300c in accordance with one embodiment.

FIG. 3C illustrates regions of interest 300c in accordance with one embodiment. The first region of interest 310 and second region of interest 312 may be selected from randomly chosen bands of pixels 304, as illustrated in FIG. 3B. The first region of interest 310 and second region of interest 312 may be examined as disclosed herein for smoothness of each single pixel within the regions of interest as compared with its group of neighboring pixels, as described with respect to FIG. 2.

Figure 4:
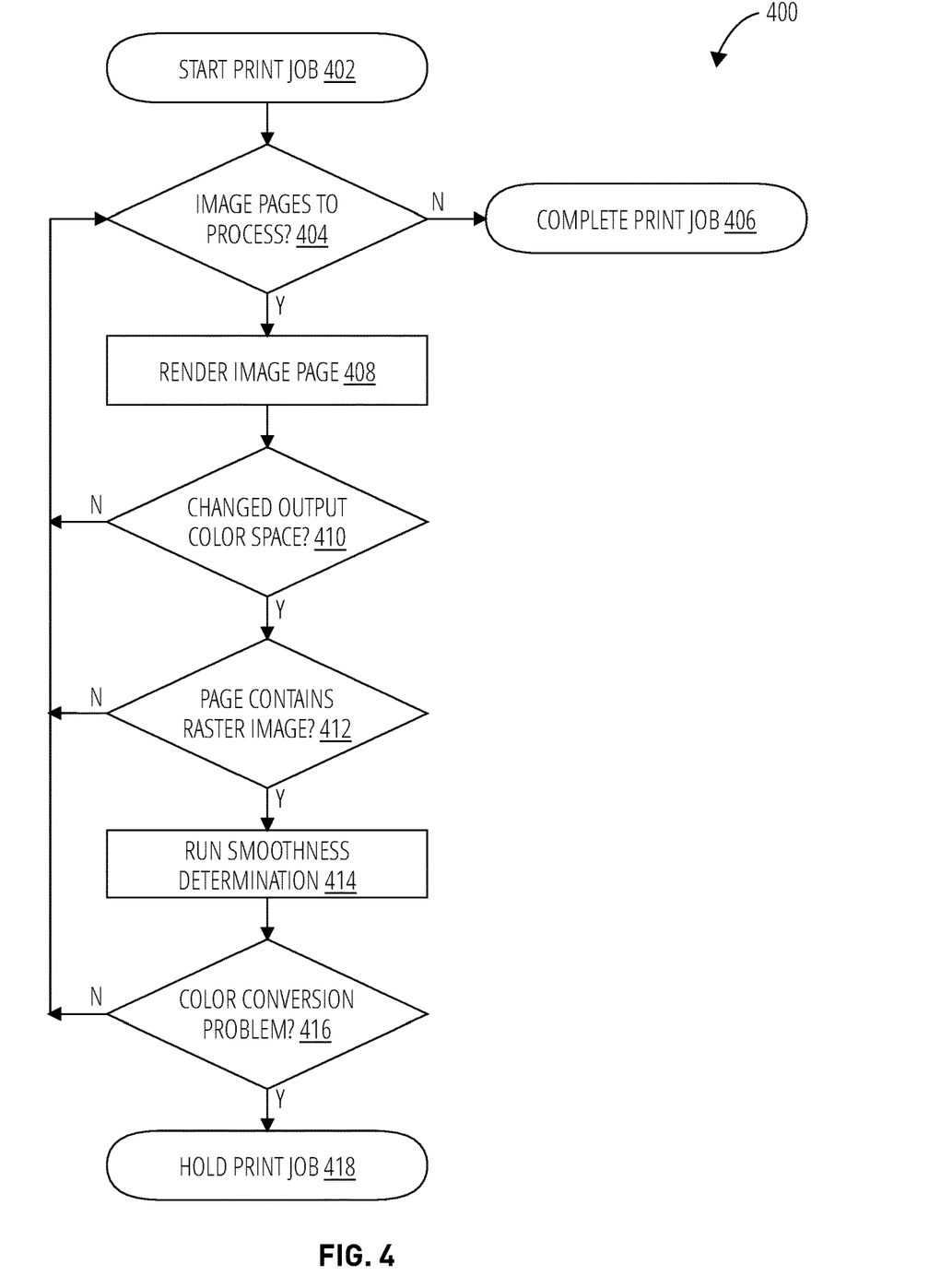
FIG. 4 illustrates a print job processing routine 400 in accordance with one embodiment.

FIG. 4 illustrates a print job processing routine 400 implementing the disclosed solution in one embodiment. In a production printing system, each page of each print job may involve color conversion in order to be correctly printed using the print engine's available inks, toners, and papers. Normally, there may be one output color space per job, and so one set of data (color tables, etc.) may be used in the conversion. It is possible, however, for the output color space to change for each page, and for different color data to be used for each page. A change in the output color space can be detected when a new page begins, as it involves a change in the output intent attribute for the page. For each page in which a new output color space is used, if the page contains images, one rendered image should be verified for correct color conversion, as follows.

At the start 402 step for the print job, a document may be evaluated to see if any of its pages contain images. At decision step 404, if there are no image pages in the document, the print job may be processed to completion at end step 406.

If decision step 404 determines there are image pages to process, an image page may be rendered at step 408. If the output color space has been changed, as determined at decision step 410, the page may be examined for a raster image at decision step 412. If the output color space has not changed since a previous check, the process may return to decision step 404 to look for additional image pages with no action.

If decision step 412 determines that the page contains a raster image, the smoothness determination may be run at step 414. If decision step 412 does not detect a raster image, the process may return to decision step 404 to evaluate the document for additional image pages.

Figure 5:
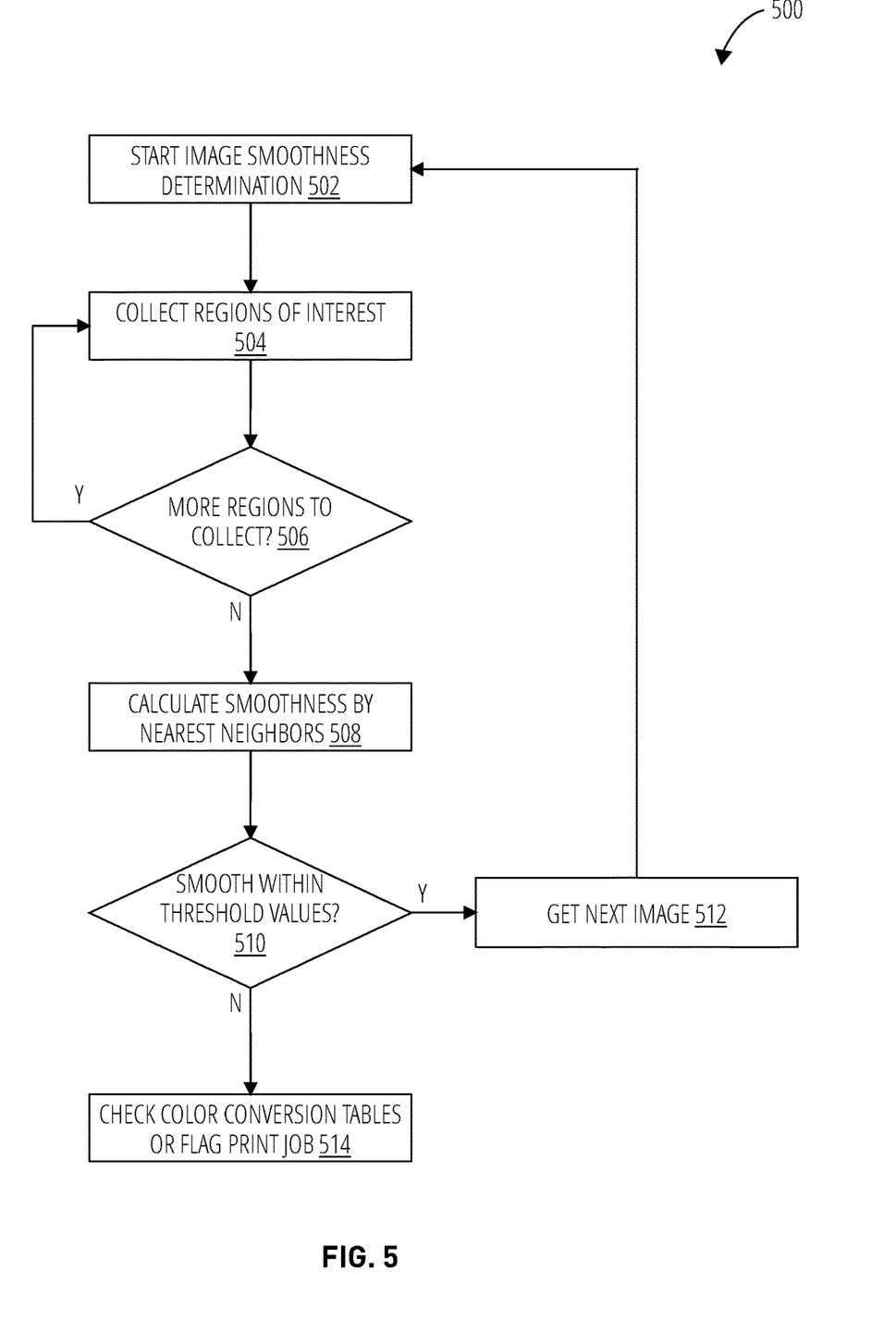
FIG. 5 illustrates a smoothness determination routine 500 in accordance with one embodiment.

At step 414, a smoothness determination may be performed for pages that qualify for this process. The smoothness determination routine 500 illustrated in FIG. 5 provides additional information for this step. If a color conversion problem is detected at decision step 416, the print job may be flagged or held at end step 418. If no color conversion problem is detected at decision step 416, the process may return to decision step 404 to determine if additional pages have images and should be examined. When all image pages have been examined and no conversion problems are detected, the print job may be completed at end step 406.

FIG. 5 illustrates a smoothness determination routine 500 in accordance with one embodiment. During the course of a print job, as illustrated in FIG. 4 print job processing routine 400, a smoothness determination may be needed, and may begin at step 502.

At step 504 regions of interest may be collected from an image on a page being evaluated for smoothness. The location and number of regions to collect may be selected randomly or may be configured based on attributes detected from the image or included with the print job. At decision step 506, it may be determined whether enough regions of interest have been collected. If there are more regions to collect, the routine may return to step 504 until all regions of interest are collected.

Once all regions of interest are collected, smoothness may be calculated for each pixel within the regions based on a comparison with the pixel's nearest neighbors at step 508. This may be performed as described with respect to FIG. 1A through FIG. 3A. The calculation process is also illustrated in further detail by FIG. 6 routine for calculating and comparing smoothness 600.

At decision step 510, it may be determined whether the smoothness determined at step 508 is within pre-configured threshold values, such as 10%. If smoothness does not meet the configured threshold values, the process may proceed to step 514. At step 514 the color conversion tables may be checked. This is also described in further detail with respect to FIG. 6. If at decision step 510 the smoothness is determined to meet the desired threshold values, the routine may consider the next image at step 512. The next image may be examined with the process returning to step 502.

Figure 6:
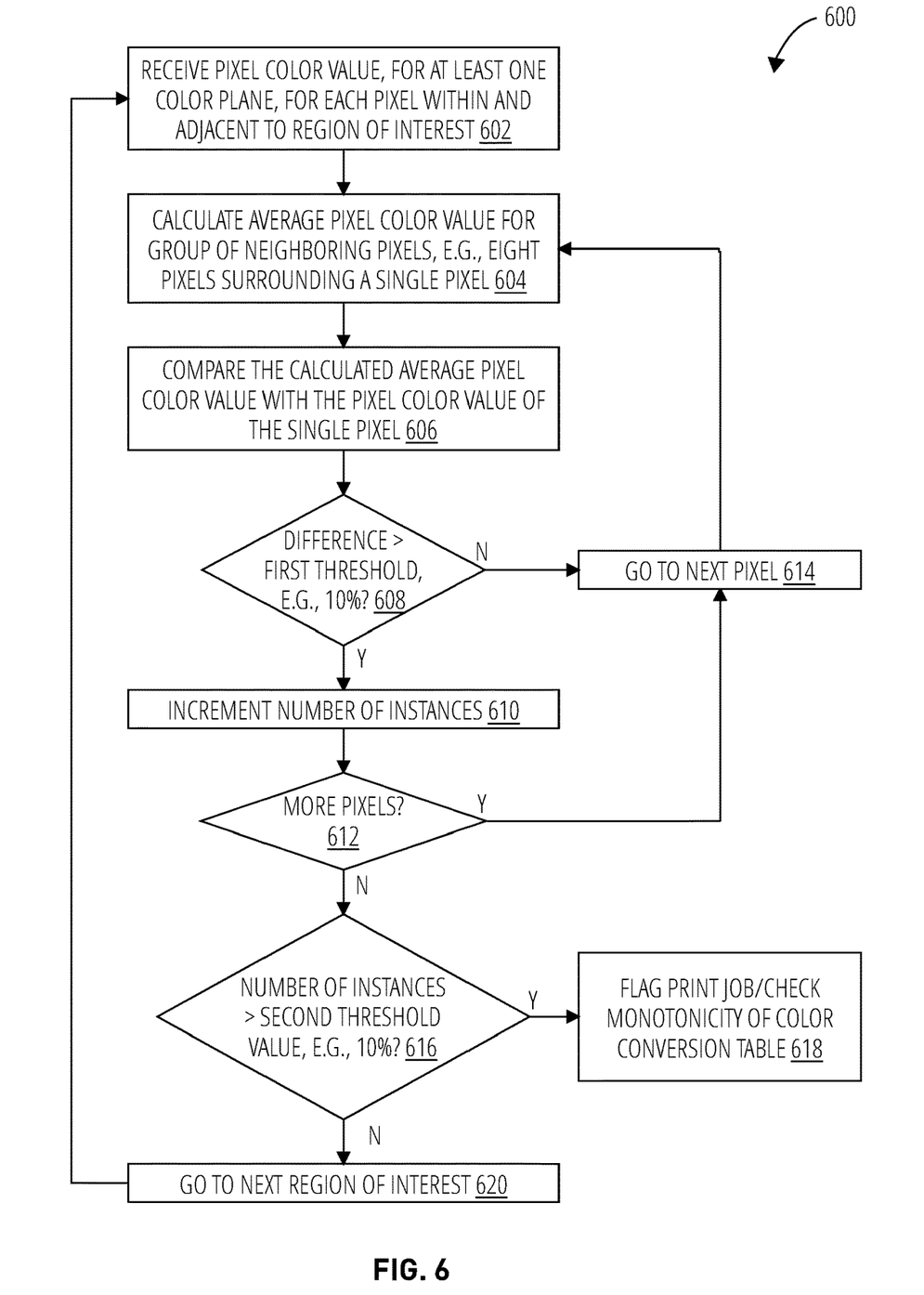
FIG. 6 illustrates a routine for calculating and comparing smoothness 600 in accordance with one embodiment.

FIG. 6 illustrates a routine for calculating and comparing smoothness 600 in accordance with one embodiment. The routine begins at step 602 with receiving a pixel color value for at least one color plane for each single pixel within a region of interest and for the pixels adjacent to the region of interest.

At step 604, the average pixel color value is calculated for a group of neighboring pixels immediately surrounding a single pixel under examination. For example, the group of neighboring pixels may be a group of eight pixels adjacent to the four sides and four corners of the single pixel, as illustrated in FIG. 2. The average pixel color value for the group of neighboring pixels may be compared with the pixel color value of the single pixel in step 606.

At decision step 608, if it is determined that the difference between the average pixel color value and the pixel color value of the single pixel is within a first threshold value, no action need be taken. The next pixel may be evaluated at step 614. To evaluate that next pixel, the routine may return to step 604. If the difference detected in step 606 exceeds the first threshold value, a number of instances may be incremented in step 610. In one embodiment, the first threshold value may be 10%. This is discussed in additional detail with respect to FIG. 2.

At decision step 612, the routine may assess whether there are more pixels in the region of interest waiting to be examined. If there are, the next pixel is assessed at step 614, and the routine returns to step 604. If all pixels in the region of interest have been examined, the total number of instances is considered at decision step 616. If the number of instances is less than or equal to a second threshold value, the region of interest may be considered adequately smooth, and the next region of interest, if any, may be examined. In one embodiment, the second threshold value may be 10%.

In one embodiment, the decision to examine more regions of interest may depend on the uniformity of the region(s) of interest that have been examined. A particular, randomly-selected region where all of the pixels have very similar color values may not be representative enough of the image to help determine smoothness. If a number of pixels within a region of interest having the same pixel color value meets a third threshold value, additional regions of interest may be examined. In one embodiment, this third threshold value may be 95%. Thus if 95% or more of the single pixels in the region of interest have the same pixel color value, a new region of interest may be examined at step 620. The routine may return to step 602 to examine the new region of interest.

If at decision step 616 the number of instances where a region of interest lacks smoothness exceed the second threshold value of, for example, 10%, the routine may at step 618 flag the print job for review. The color conversion table may also be checked at step 618 for monotonicity. Either the entire table should be monotonic, i.e., for all x, $f(x+1)>=f(x)$, or, if not, it should be monotonic within sections, i.e., any x failing the above test should be the first value of a new sequence of length greater than one, for which the test passes.

Figure 7:
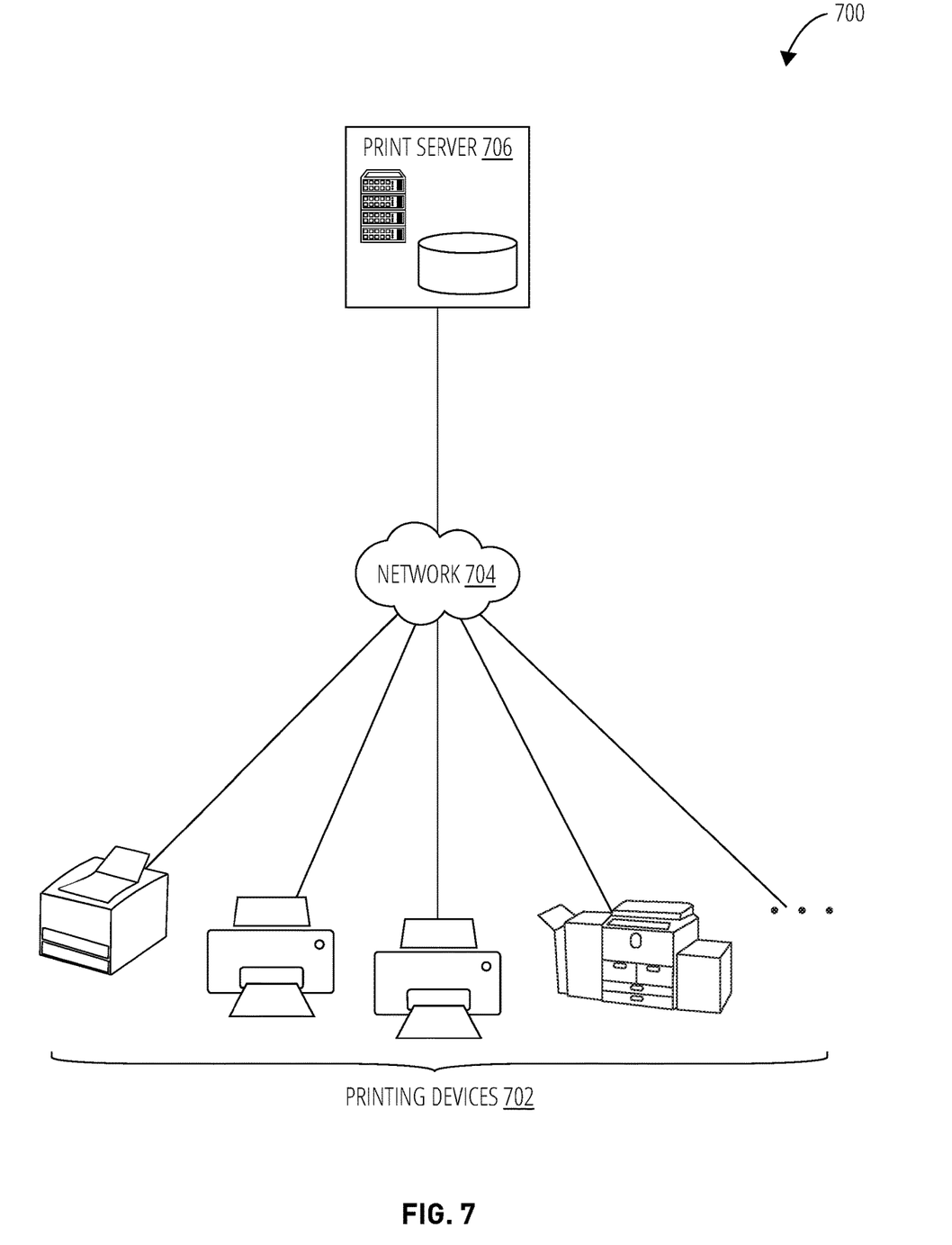
FIG. 7 illustrates a system 700 in accordance with one embodiment.

FIG. 7 is a block diagram illustrating an example system 700 according to an example embodiment of the present disclosure. System 700 may include one or more printing devices 702, and a print server 706 which may be connected via a network 704. In some examples, system 700 may include more or fewer printing devices 702 than are shown in FIG. 7, may include additional servers and/or computing devices, and/or may include one or more other systems or devices in addition to or instead of those shown in FIG. 7.

Printing devices 702 include one or more multi-function printing devices and/or stand-alone printing devices. A given printing device may be configured to perform one or more functions such as printing, scanning, emailing, storing, modifying, receiving, or transmitting one or more documents and/or files. In some examples, printing devices 702 may include one or more computing devices such as system architecture and data processing device 900, or one or more components or aspects of system architecture and data processing device 900 described in more detail with respect to FIG. 9. In some examples, one or more of the printing devices 702 may be connected to one or more personal computers, laptops, servers, handheld devices, and/or other computing devices and systems, which may be used in connection with the printing device to perform one or more actions, such as those described above.

Each printing device 702 may be configured to perform one or more steps, actions, or functions described herein. For example, a printing device may communicate with print server 706, to transmit and/or receive data or information via network 704 including time intervals, numbers of printed pages, numbers of errors, and other related information.

Print server 706 may include a cloud based server, for example, that can perform one or more tasks to manage and/or maintain printing devices 702. Print server 706 may communicate with printing devices 702 to transmit or receive data. For instance, in some examples print server 706 may transmit a command to the one or more printing devices 702 to reset, install updates, or perform one or more printing or maintenance functions or operations. In other examples, print server 706 may receive data from the one or more printing devices 702, such as a page count (i.e., number of pages printed), an error count, one or more error messages, or data corresponding to a page count, error count, and/or error message.

In some examples, print server 706 may be configured to perform one or more functions or steps of the example methods and systems disclosed herein. For instance, print server 706 may determine a time interval, number of pages printed, and number of printing-device errors for one or more printing devices. Print server 706 may also determine a ratio of printed pages per printing-device error for one or more printing devices over a given time interval. Further, print server 706 may determine one or more Markov chain coefficients based on the time interval, number of pages printed, number of printing-device errors, and/or determined ratio. Print server 706 may then determine an operational status of one or more printing devices and take one or more actions based on the determined operational status.

Print server 706 may include one or more computing devices or systems (not shown), and may be consolidated in a single physical location, or distributed across two or more physical locations. Print server 706 may include hardware, software, and/or firmware configured to carry out one or more functions or acts described herein.

Network 704 in the system 700 may include one or more wired or wireless connections that support communication between the devices of system 700. In some examples, network 704 may support one or more communication protocols, such as Extensible Messaging and Presence Protocol (XMPP), File Transfer Protocol (FTP), HyperText Transport Protocol (HTTP), Java Message Service (JMS), Simple Object Access Protocol (SOAP), Short Message Service (SMS), Simple Mail Transfer Protocol (SMTP), Simple Network Management Protocol (SNMP), Transmission Control Protocol/Internet Protocol (TCP/IP), User Datagram Protocol (UDP), Lightweight Directory Access Protocol (LDAP), and the Message Queue (MQ) family of network protocols.

Network 704 may be configured to allow communication between print server 706 and one or more printing devices 702, between the printing devices 702 themselves, and/or between one or more other devices or systems and the system 700. Such communications may include commands, requests, and/or data corresponding to documents, printing-device errors, and/or other data.

Figure 8:
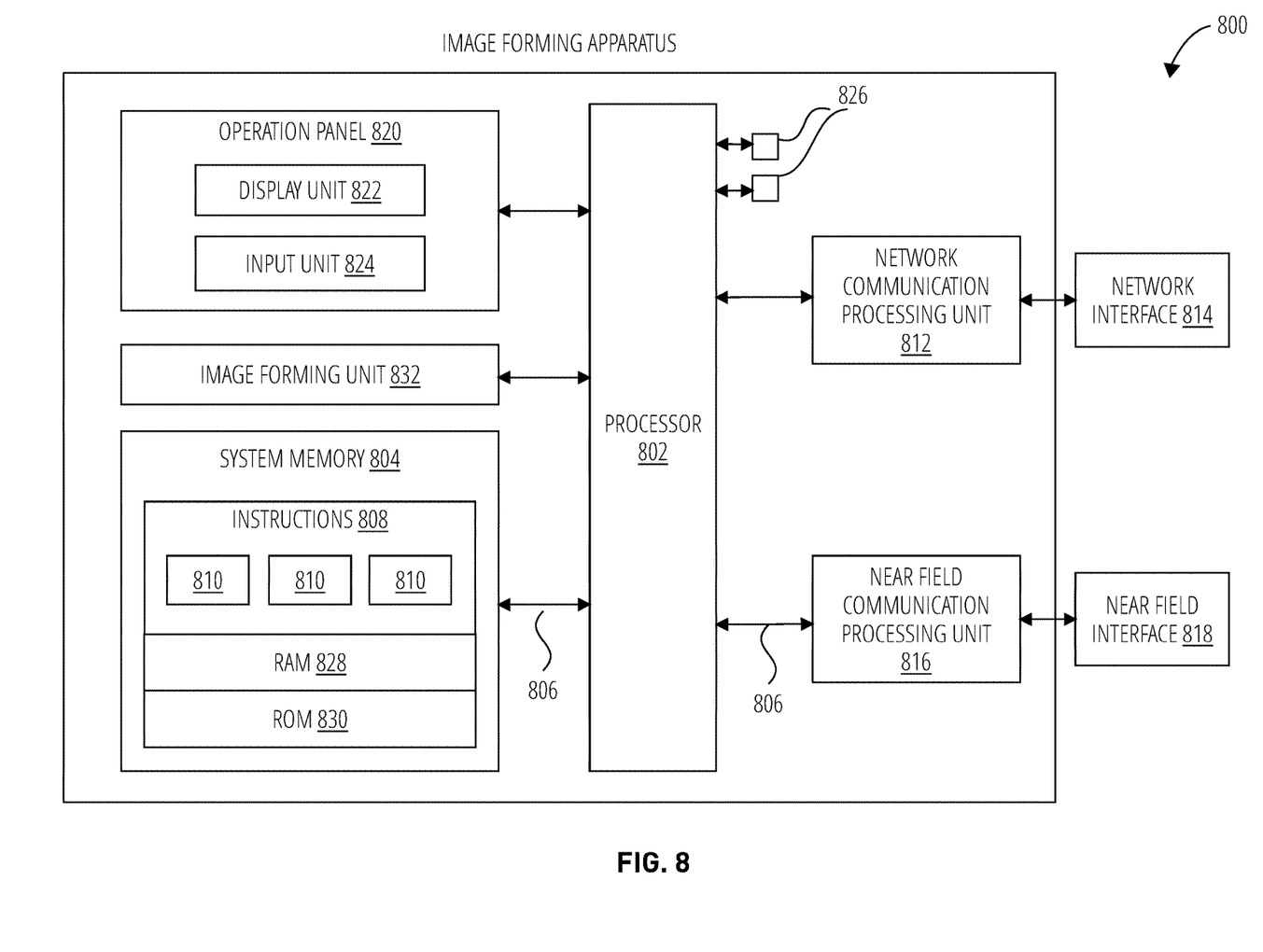
FIG. 8 illustrates an image forming apparatus 800 in accordance with one embodiment.

Referring now to FIG. 8, the image forming apparatus 800 may be described in more detail in terms of the machine elements that provide functionality to the systems and methods disclosed herein. The components of the image forming apparatus 800 may include, but are not limited to, one or more processors 802, a system memory 804, and a system bus 806 that may couple various system components including the system memory 804 to the processor 802. The image forming apparatus 800 may typically include a variety of computer system readable media. Such media could be chosen from any available media that is accessible by the image forming apparatus 800, including non-transitory, volatile and non-volatile media, removable and non-removable media, and read only memory or ROM 830. The system memory 804 could include one or more image forming device readable media in the form of volatile memory, such as a random access memory or RAM 828 and/or a cache memory. By way of example, the system memory 804 may be provided for reading from and writing to a non-removable, non-volatile magnetic media device typically called a "hard drive."

The system memory 804 may include at least one program product/utility or instructions 808, having a set (e.g., at least one) of program modules 810 that may be configured to carry out the functions of embodiments of the disclosure. The program modules 810 may include, but is not limited to, an operating system, one or more application programs, other program modules, and program data. Each of the operating systems, one or more application programs, other program modules, and program data or some combination thereof, may include an implementation of a networking environment. The program modules 810 may include procedures such as a page converter, rasterizer, compression code, page print scheduler, print engine manager, and similar printing applications (i.e., printer firmware). The program modules 810 generally carry out the functions and/or methodologies of embodiments of the disclosure as described herein.

The image forming apparatus 800 may have one or more communication modules. The communication modules may allow the image forming apparatus 800 to communicate with one or more networks (i.e., network 704 introduced in FIG. 7) such as a local area network (LAN), a general wide area network (WAN), wireless local area network (WLAN) and/or a public network. In accordance with one embodiment, the communication modules may include a network communication processing unit 812 coupled to a network interface 814. The network communication processing unit 812 and the network interface 814 may allow the image forming apparatus 800 to communicate with one or more networks. These networks may be a local area network (LAN), a general wide area network (WAN), a wireless local area network, a public network, a cellular network as well as other type of networks. The communication modules may include a near field communication processing unit 816 coupled to a near field interface 818. The near field communication processing unit 816 and the near field interface 818 may allow the image forming apparatus 800 to communicate with other electronic devices located near the image forming apparatus 800 using Bluetooth, infrared or similar wireless communication protocols.

The image forming apparatus 800 may include an operation panel 820. The operation panel 820 may include a display unit 822 and an input unit 824 for facilitating human interaction with the image forming apparatus 800. The display unit 822 may be any electronic video display, such as a LCD display, LED display and similar display types. The input unit 824 may include any combination of devices that allow users to input information into the operation panel 820, such as buttons, a keyboard, switches, and/or dials. In addition, the input unit 824 may include a touch-screen digitizer overlaid onto the display unit 822 that can sense touch and interact with the display unit 822.

The image forming apparatus 800 may have one or more sensors 826. Each sensor 826 may be used to monitor certain operating conditions of the image forming apparatus 800. Sensors 826 may be used to indicate a location of a paper jam, document mis-feed, toner level, as well as other operating conditions. The above is given as examples and should not be read in a limiting manner. Each sensor 826 may be coupled to the processor 802. When a sensor 826 detects an operational issue as may be disclosed below, the sensor 826 may send a signal to the processor 802. The processor 802 may generate an error alert associated with the operational issue. The processor 802 may transmit the error alert to an external device using one of the communication modules.

The image forming unit 832 may be a logical module residing outside of system memory 804 and the processor 802 as shown, but may in some embodiments be incorporated within the processor 802, and may act upon one or more program modules 810 stored in system memory 804. The image forming unit 832 may include or connect to hardware that captures images within a physical document and converts these to data, such as a scanning device. The image forming unit 832 may also act upon data provided from system memory 804 or the communication modules representing pages and images of a scanned or digitally created file. The image forming unit 832 may provide rendering logic, rasterization logic, color conversion logic, etc., as well as logic to implement the disclosed solution.

As will be appreciated by one skilled in the art, aspects of this disclosure may be embodied as a system, method or process, or computer program product. Accordingly, aspects of this disclosure may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of this disclosure may take the form of a computer program product embodied in one or more computer readable media having computer readable program code embodied thereon.

Any combination of one or more computer readable media (for example, system memory 804) may be utilized. In the context of this disclosure, a computer readable storage medium may be any tangible or non-transitory medium that can contain, or store a program (for example, the program modules 810) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Figure 9:
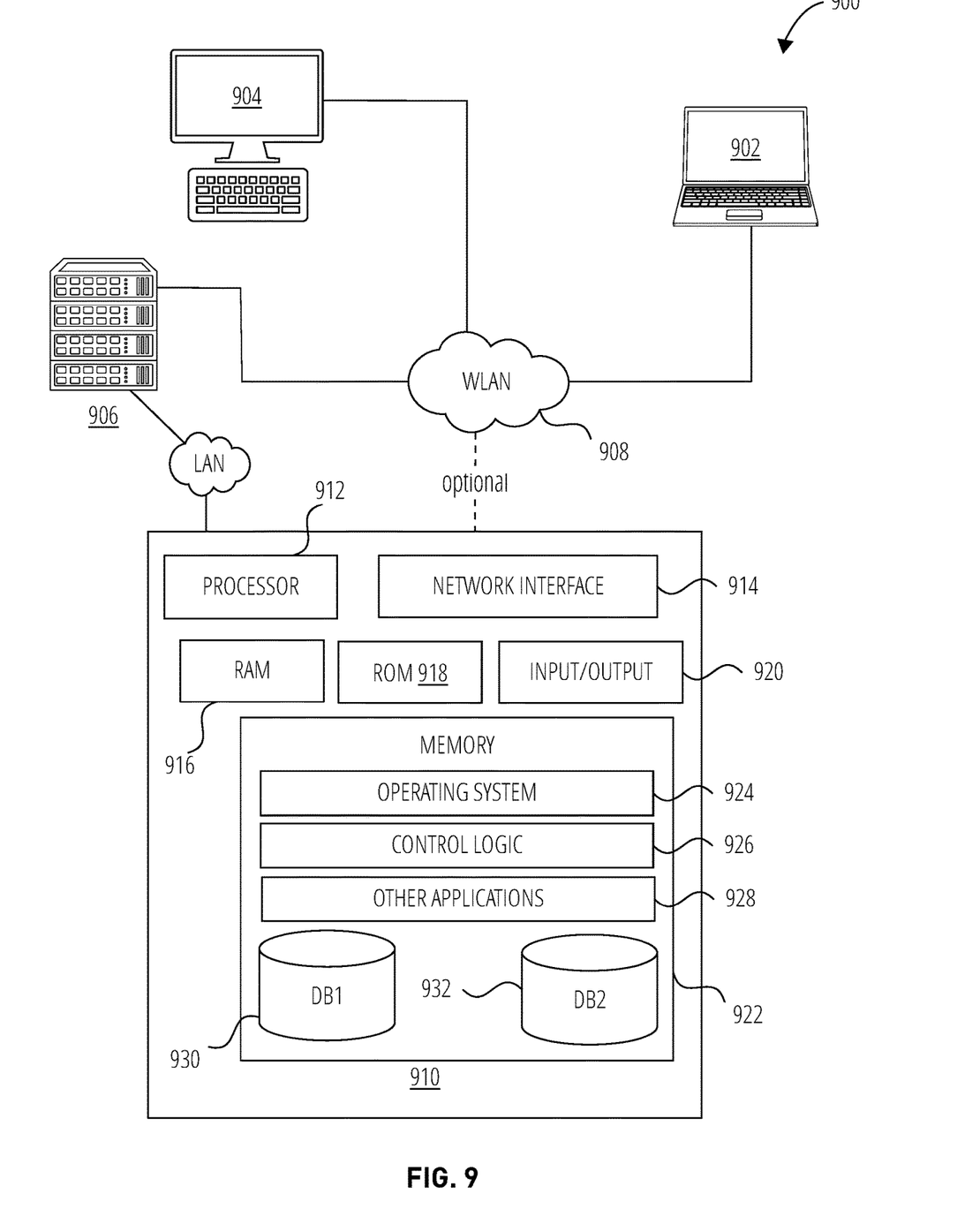
FIG. 9 depicts an illustrative system architecture and data processing device 900 that may be used in accordance with one or more illustrative aspects described herein.

FIG. 9 illustrates one example of a system architecture and data processing device 900 that may be used to implement one or more illustrative aspects described herein in a standalone and/or networked environment. Various network nodes data server 910, web server 906, computer 904, and laptop 902 may be interconnected via a wide area network 908 (WAN), such as the internet. Other networks may also or alternatively be used, including private intranets, corporate networks, LANs, metropolitan area networks (MANs) wireless networks, personal networks (PANs), and the like. Network 908 is for illustration purposes and may be replaced with fewer or additional computer networks. A local area network (LAN) may have one or more of any known LAN topology and may use one or more of a variety of different protocols, such as ethernet. Devices data server 910, web server 906, computer 904, laptop 902 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 910, web server 906, and client computer 904, laptop 902. Data server 910 provides overall access, control and administration of databases and control software for performing one or more illustrative aspects described herein. Data server data server 910 may be connected to web server 906 through which users interact with and obtain data as requested. Alternatively, data server 910 may act as a web server itself and be directly connected to the internet. Data server 910 may be connected to web server 906 through the network 908 (e.g., the internet), via direct or indirect connection, or via some other network. Users may interact with the data server 910 using remote computer 904, laptop 902, e.g., using a web browser to connect to the data server 910 via one or more externally exposed web sites hosted by web server 906. Client computer 904, laptop 902 may be used in concert with data server 910 to access data stored therein or may be used for other purposes. For example, from client computer 904, a user may access web server 906 using an internet browser, as is known in the art, or by executing a software application that communicates with web server 906 and/or data server 910 over a computer network (such as the internet).

Servers and applications may be combined on the same physical machines, and retain separate virtual or logical addresses, or may reside on separate physical machines. FIG. 9 illustrates just one example of a network architecture that may be used, and those of skill in the art will appreciate that the specific network architecture and data processing devices used may vary, and are secondary to the functionality that they provide, as further described herein. For example, services provided by web server 906 and data server 910 may be combined on a single server.

Each component data server 910, web server 906, computer 904, laptop 902 may be any type of known computer, server, or data processing device. Data server 910, e.g., may include a processor 912 controlling overall operation of the data server 910. Data server 910 may further include RAM 916, ROM 918, network interface 914, input/output interfaces 920 (e.g., keyboard, mouse, display, printer, etc.), and memory 922. Input/output interfaces 920 may include a variety of interface units and drives for reading, writing, displaying, and/or printing data or files. Memory 922 may further store operating system software 924 for controlling overall operation of the data server 910, control logic 926 for instructing data server 910 to perform aspects described herein, and other application software 928 providing secondary, support, and/or other functionality which may or may not be used in conjunction with aspects described herein. The control logic may also be referred to herein as the data server software control logic 926. Functionality of the data server software may refer to operations or decisions made automatically based on rules coded into the control logic, made manually by a user providing input into the system, and/or a combination of automatic processing based on user input (e.g., queries, data updates, etc.).

Memory 922 may also store data used in performance of one or more aspects described herein, including a first database 932 and a second database 930. In some embodiments, the first database may include the second database (e.g., as a separate table, report, etc.). That is, the information can be stored in a single database, or separated into different logical, virtual, or physical databases, depending on system design. Web server 906, computer 904, laptop 902 may have similar or different architecture as described with respect to data server 910. Those of skill in the art will appreciate that the functionality of data server 910 (or web server 906, computer 904, laptop 902) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the disclosure as claimed. The scope of disclosed subject matter is not limited to the depicted embodiments but is rather set forth in the following claims.

What is claimed is:

1. A method comprising:
   initiating a smoothness determination including:
   identifying a region of interest on an image for a print job, wherein the region of interest comprises pixels;
   receiving a pixel color value, for at least one color plane, for each pixel in the region of interest, and pixel color values for pixels immediately adjacent to the region of interest;
   calculating an average pixel color value, for a group of neighboring pixels immediately surrounding each single pixel in the region of interest;
   operating a comparator to compare the calculated average pixel color value of the group of neighboring pixels to the pixel color value of the single pixel corresponding to the group of neighboring pixels;
   calculating a number of instances where the pixel color value of the single pixel differs, by more than a first threshold value, from the average pixel color value of the group of neighboring pixels; and
   determining if the number of instances is more than a second threshold value:
   on condition the number of instances is less than the second threshold value:
   obtain a new image; and
   on condition the number of instances is more than the second threshold value:
   flag the print job for review.

2. The method of claim 1, wherein the group of neighboring pixels comprises a group of eight pixels immediately surrounding each single pixel.

3. The method of claim 1, further comprising:
   on condition the number of instances is more than the second threshold value:
   check a color conversion table of the print job for monotonicity.

4. The method of claim 3, wherein the monotonicity is determined by whether a next value in the color conversion table is equal to or greater than a preceding value, for a given section of the color conversion table.

5. The method of claim 1, further comprising determining if additional regions of interest need to be identified.

6. The method of claim 5, wherein the determining if additional regions of interest need to be identified includes examining the pixel color values to determine if more than a third threshold value of the pixel color values have a same pixel color value.

7. The method of claim 6, wherein the third threshold value is at least 95%.

8. The method of claim 1, wherein the first threshold value is at least 10% and the second threshold value is at least 10%.

9. The method of claim 1, further comprising analyzing each page in the print job to detect a change in an output color space, including:
on condition the change in the page is detected:
determine if the page comprises the image,
on condition the page comprises the image:
initiate the smoothness determination,
on condition the page does not comprise the image:
analyze a next page for the image,
on condition the change in the page is not detected:
analyze the next page in the print job for the change in the output color space.

10. The method of claim 1, further comprising:
dividing the image into a plurality of bands of pixels;
selecting one of the bands of pixels; and
initiating the smoothness determination on the selected band of pixels.

11. A system comprising:
a printing device;
a print server;
a processor; and
a memory storing instructions that, when executed by the processor, configure the system to:
initiate a smoothness determination including:
identify a region of interest on an image for a print job, wherein the region of interest comprises pixels;
receive a pixel color value, for at least one color plane, for each pixel in the region of interest, and pixel color values for pixels immediately adjacent to the region of interest;
calculate an average pixel color value, for a group of neighboring pixels immediately surrounding each single pixel in the region of interest;
operate a comparator to compare the calculated average pixel color value of the group of neighboring pixels to the pixel color value of the single pixel corresponding to the group of neighboring pixels;
calculate a number of instances where the pixel color value of the single pixel differs, by more than a first threshold value, from the average pixel color value of the group of neighboring pixels;
determine if the number of instances is more than a second threshold value:
on condition that the number of instances is less than the second threshold value:
obtain a new image;
on condition that the number of instances is more than the second threshold value:
flag the print job for review.

12. The system of claim 11, wherein the instructions further include initiating, by the print server, the smoothness determination before sending the print job to the printing device.

13. The system of claim 12, wherein the group of neighboring pixels comprises a group of eight pixels immediately surrounding each single pixel.

14. The system of claim 13, wherein the instructions further include:
on condition the number of instances is more than the second threshold value:
check a color conversion table of the print job for monotonicity.

15. The system of claim 14, wherein the monotonicity is determined by whether a next value in the color conversion table is equal to or greater than a preceding value, for a given section of the color conversion table.

16. A non-transitory computer-readable storage medium, the computer-readable storage medium including instructions that when executed by a computer, cause the computer to:
initiate a smoothness determination including:
identify a region of interest on an image for a print job, wherein the region of interest comprises pixels;
receive a pixel color value, for at least one color plane, for each pixel in the region of interest, and pixel color values for pixels immediately adjacent to the region of interest;
calculate an average pixel color value, for a group of neighboring pixels immediately surrounding each single pixel in the region of interest;
operate a comparator to compare the calculated average pixel color value of the group of neighboring pixels to the pixel color value of the single pixel corresponding to the group of neighboring pixels;
calculate a number of instances where the pixel color value of the single pixel differs, by more than a first threshold value, from the average pixel color value of the group of neighboring pixels;
determine if the number of instances is more than a second threshold value:
on condition that the number of instances is less than the second threshold value:
obtain a new image;
on condition that the number of instances is more than the second threshold value:
flag the print job for review.

17. The non-transitory computer-readable storage medium of claim 16, wherein the group of neighboring pixels comprises a group of eight pixels immediately surrounding each single pixel.

18. The non-transitory computer-readable storage medium of claim 16, wherein the instructions further include determining if additional regions of interest need to be identified.

19. The non-transitory computer-readable storage medium of claim 18, wherein the determining if additional regions of interest need to be identified includes examining the pixel color values to determine if more than a third threshold value of the pixel color values have a same pixel color value.

20. The non-transitory computer-readable storage medium of claim 16, wherein the instructions further include:
dividing the image into a plurality of bands of pixels;
selecting one of the bands of pixels; and
initiating the smoothness determination on the selected band of pixels.

* * * * *